United States Patent

[11] 3,630,355

[72] Inventor William M. Christensen
Altamonte Springs, Fla.
[21] Appl. No. 824,952
[22] Filed May 15, 1969
[45] Patented Dec. 28, 1971
[73] Assignee FMC Corporation
San Jose, Calif.

[54] SUCTION CLEANING APPARATUS FOR DISCRETE CONVEYOR LOADS
4 Claims, 3 Drawing Figs.

[52] U.S. Cl. .................................................. 209/137, 209/147, 209/154
[51] Int. Cl. ..................................................... B07b 4/08
[50] Field of Search ............................................. 209/30, 31, 32, 33, 34, 35, 36, 37, 133–139 A, 147, 154, 421

[56] References Cited
UNITED STATES PATENTS
3,227,276  1/1966  Leighton et al. ............... 209/139
3,428,172  2/1969  Hoffman ....................... 209/136 X Primary Examiner—Frank W. Lutter
Assistant Examiner—William Cuchlinski, Jr.
Attorneys—F. W. Anderson and C. E. Tripp ABSTRACT: A nut harvester has an elevator housing with a bucket conveyor therein. A suction duct has an inlet opening adjacent the conveyor. The conveyor buckets, which have vented bottoms, pass through a throat one at a time as they approach the duct inlet, and a flexible flap stretches over the bucket to define with the throat and bucket a chamber at the inlet opening through which debris from the bucket is drawn.

3,630,355

SUCTION CLEANING APPARATUS FOR DISCRETE CONVEYOR LOADS

BACKGROUND OF THE INVENTION

Many types of crop harvesters, particularly those which harvest crops from the ground, generally pick up dirt, twigs, and other debris in addition to the crops being harvested. In particular, machines which have suction inlets close to the ground to capture the crops will generally pick up a wide assortment of debris. Accordingly, most harvesters have one or more mechanisms to separate the crops from the foreign matter picked up therewith. The more mechanisms provided, the more efficiently the crop will be purged of the debris accumulated by the harvester when the crop was picked up.

SUMMARY OF THE INVENTION

In the present invention, simple, effective apparatus is provided for removing debris from crops in a harvesting machine. The mechanism is particularly suited for giving nuts a final cleaning in a nut harvester machine. In brief, in the preferred form of the invention, the nut harvester has an elevator housing in which a bucket conveyor carries discrete loads of nuts to the top of a container into which the nuts are dumped. A suction duct has an inlet opening adjacent the conveyor. A throat is formed at the inlet opening by the sidewalls of the elevator housing and by a baffle plate connected to the suction duct. As the buckets move up one at a time into the throat, a flexible flap extending from the duct engages an upstanding backplate of each bucket to form a chamber with the bucket and the throat. The bucket, which continuously moves through the throat, has a vented bottom, and air is drawn up through the bucket and chamber into the suction duct, sucking the dirt and debris out of the bucket on the run. As the bucket advances, the flexible flap yields to allow the bucket to pass.

It is therefore one object of the present invention to provide suction crop-cleaning apparatus. It is another object of the present invention to provide a suction cleaning mechanism in a harvester to clean discrete loads. It is yet another object of the present invention to clean buckets one at a time on the run in a nut harvester.

DESCRIPTION OF THE PREFERRED EMBODIMENT

Figure 1:
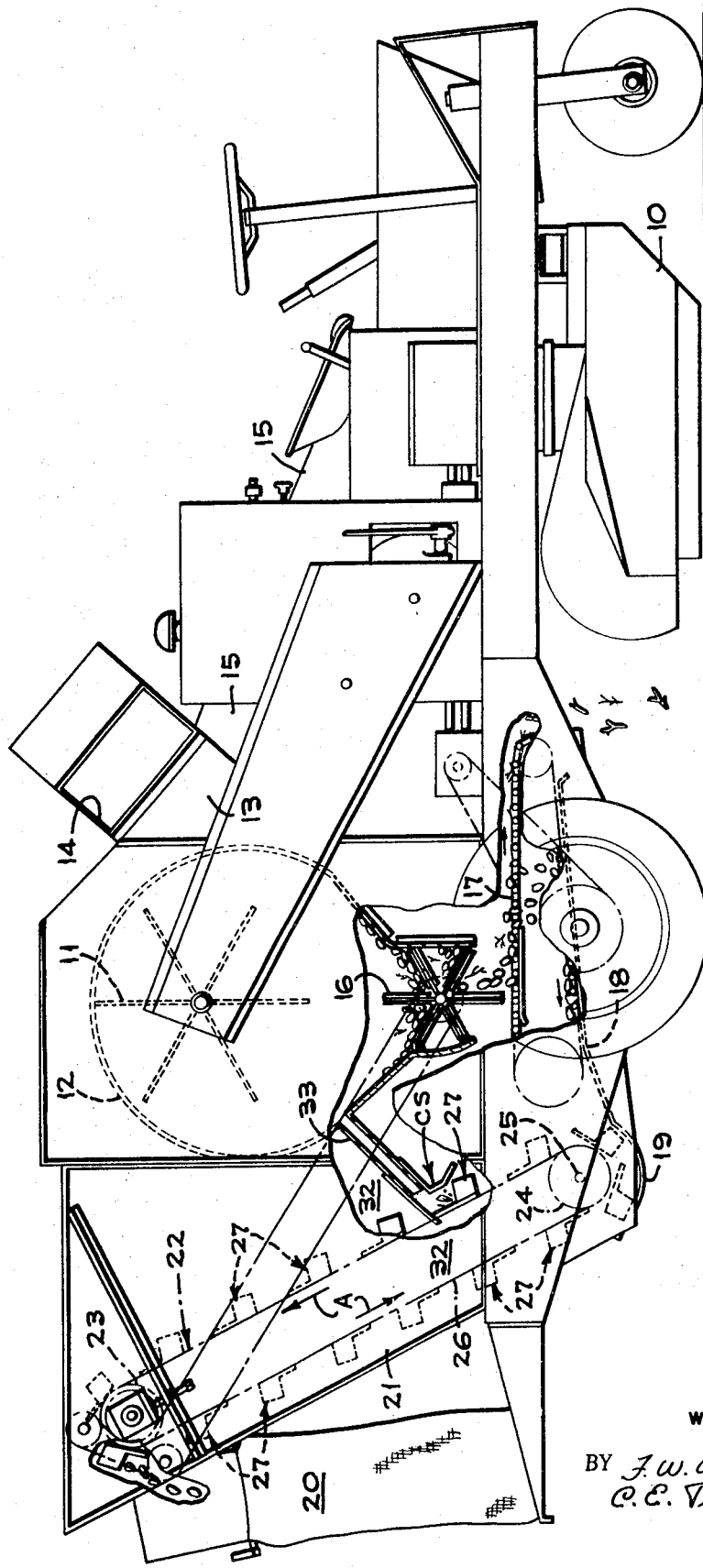
FIG. 1 is a side view of a nut harvester machine embodying the apparatus of the present invention.

There is shown in FIG. 1 a nut harvester having a suction pickup head 10. A suction system includes a blower fan 11 in a housing 12. The fan 11 expels air from housing 12 through discharge duct 13 and out discharge opening 14. Air is drawn through an inlet opening (not shown) in the suction pickup head 10 and up a duct 15 which is connected between the housing 12 and pickup head 10. Nuts laying on the ground are drawn up through the pickup head 10, duct 15, and into housing 12. Debris and light trash is expelled through discharge opening 14 while the nuts fall through a rotary vacuum sealing valve 16.

The nuts fall through an endless rod conveyor 17 onto a grate 18. Any large debris which falls through valve 16 with the nuts is carried away (to the right as viewed in FIG. 1) by the upper run of the conveyor, while small debris, such as dirt, falls through the grate 18. The lower run of the conveyor moves the nuts along the grate to a pocket 19 in the grate.

An elevator carries the nuts from pocket 19 and discharges them into a bag 20. The elevator, which is mounted in an elevator housing 21, comprises an endless bucket conveyor 22 which moves continuously while in operation in the direction indicated by arrows A. The conveyor 22 has a pair of upper sprockets 23 and a pair of lower sprockets 24. The lower sprockets 24 are mounted on a drive shaft 25 which is driven by means not shown. Endless chains 26 are received over the sprockets and carry buckets 27 in spaced relation.

Figure 2:
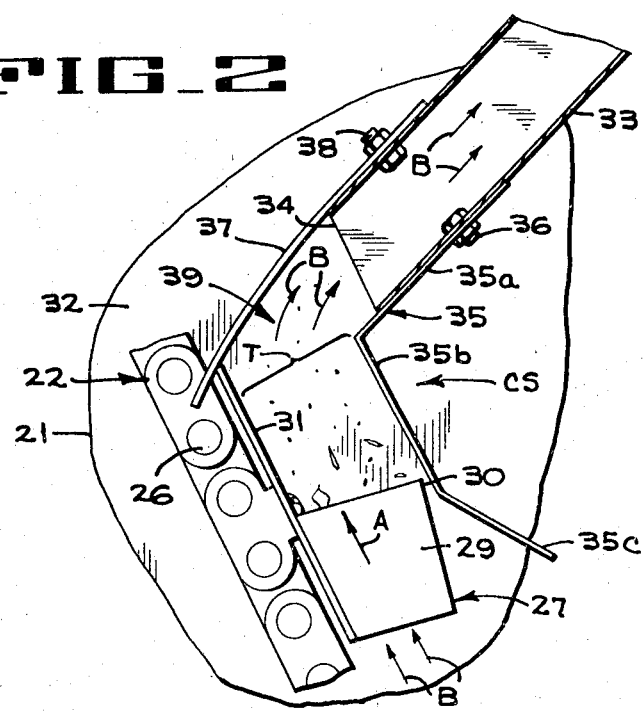
FIG. 2 is an enlarged view of the chamber formed at the inlet opening of the suction duct showing a bucket approaching the throat thereof.
Figure 4:
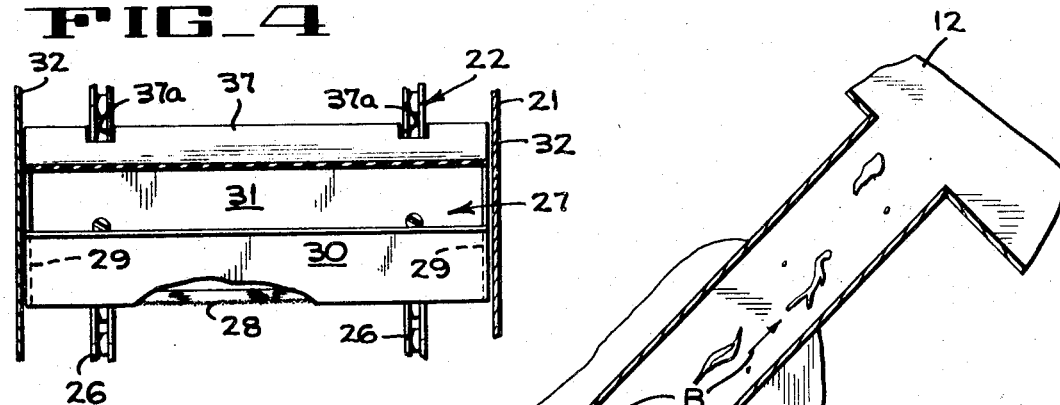
FIG. 4 is a view taken on the line 4—4 of FIG. 3.
Figure 3:
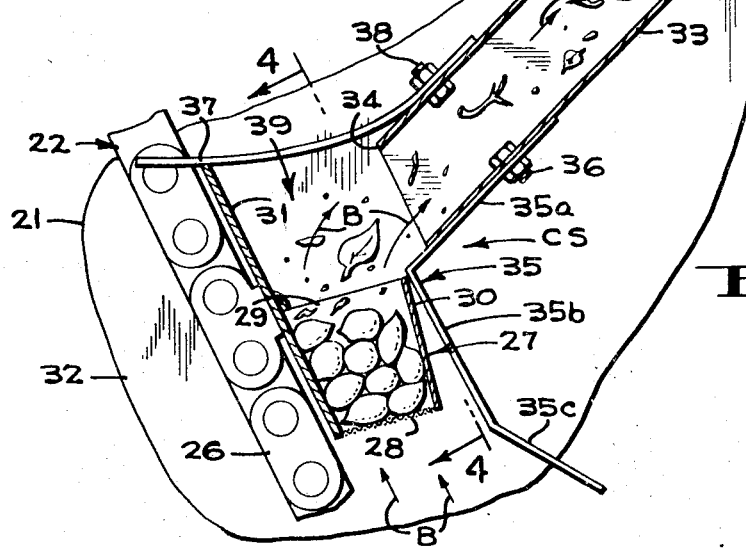
FIG. 3 is a view similar to FIG. 2 except showing the bucket advancing past the inlet opening.

As shown best in FIGS. 2, 3 and 4, each bucket 27 has a wire mesh bottom 28, and solid sides 29, front plate 30, and back 31. The back plate, which is fastened to links in the chains 26, is higher than the sides and front, which are the same height. The width of the buckets 27 is only slightly less than the width of the elevator housing 21, and the sidewalls 32 of the housing 21 are closely spaced relative to the sides 29 of the buckets 27, as shown in FIG. 4.

At a cleaning station CS a suction duct 33 extends from housing 12 and terminates at an inlet opening 34 adjacent the bucket conveyor 22, as shown in FIG. 3. A baffle plate 35, having a width equal to the width of the buckets 27, is connected by bolts 36 to the under, or upstream, side of the duct 33. The baffle plate is shaped to define three panels: an inner panel 35a extending up to the path of the buckets 27, an intermediate panel 35b extending downwardly from panel 35a, and an outer panel 35c extending back slightly from the path of the buckets. It will be noted that the baffle plate 35, and the sides 32, define a narrowing throat T or restricted passage to receive an approaching bucket 27.

A flexible flap 37, which may, for example, be made of rubber, is connected by bolts 38 at its inner end to the upper, or downstream, side of the duct 33. The flap extends outwardly from the duct to engage the upper end of the back 31 of the bucket as the bucket approaches the inlet opening 34 of the suction duct 33. The flap 37 has slots 37a therein to receive the chains 26. The flap, which is as wide as the bucket, is in closely spaced relation to the sides 32 of the elevator housing and defines with the bucket, sides 32, and baffle plate 35, a substantially closed suction chamber 39 between the bucket and the inlet, or suction opening 34 of the duct 33.

The buckets 27 travel counterclockwise and, as an elevating bucket approaches the duct 33, it enters throat T. At the same time, as shown in FIG. 2, flexible flap 37 contacts the back of the bucket to envelop the bucket, with baffle plate 35 and sides 32, and momentarily create the closed chamber 39. Air is thus drawn up through the vented bottom of buckets 27, through chamber 39, up duct 33, into chamber 12, and out discharge opening 14, as indicated by arrows B. The suction applied to each bucket, one at a time, draws out leaves, twigs, and other debris 40 to give each bucket a final cleaning before the nuts are deposited in bag 20. As the bucket 27 leaves the throat T, the suction through the bucket ceases.

Although the best mode contemplated for carrying out the present invention has been herein shown and described, it will be apparent that modification and variation may be made without departing from what is regarded to be the subject matter of the invention.

What is claimed is:

1. In a nut-harvesting machine having an elevator housing and having a bucket elevator in the housing, said elevator having a plurality of buckets with vented bottoms and upstanding back plates, means defining a suction duct having an inlet opening adjacent the fronts of said bucket elevator, means defining a throat at the upstream side of the opening to closely receive a bucket approaching the inlet opening, said throat defined by a front plate connected to the bottom of the upstream end of said suction duct and by the sidewalls of the elevator housing, a flexible flap connected to the top of the upstream end of said suction duct and extending therefrom in closely spaced relation to the housing sidewalls to engage the backplate of an approaching bucket, said flap defining a chamber with the throat and bucket whereby air may be drawn through the bucket and remove debris from the nuts.

2. In a harvesting apparatus, a housing defining a restricted passage, a plurality of crop-carrying vented buckets movable along a path through said restricted passage and in closely spaced relation thereto, means defining a suction opening adjacent said restricted passage, and a flexible flap extending across the path of the buckets beyond said suction opening to define with a bucket moving through said restricted passage a suction chamber in communication with said suction opening for the suction removal of debris from the moving bucket, said flap yieldable to permit passage of the moving bucket after the bucket passes said suction opening.

3. In a nut-harvesting machine, a bucket elevator having a housing and having an endless loop of vented buckets in the housing means defining a throat in the housing to closely confine buckets moving upwardly through said throat, means defining a suction opening above said throat, and a yieldable member extending across the housing in closely spaced relation to the sides thereof, said member positioned above said opening to define a vacuum chamber above a bucket moving through the throat, said chamber in communication with the suction opening to draw debris from said buckets as they move through the throat.

4. In a harvesting apparatus, a bucket elevator comprising an endless loop of vented buckets, a housing to receive said loop of buckets, said housing having at least one portion closely spaced to the front and to the sides of a bucket moving through said portion, means defining a suction opening at said portion of the housing, and a yieldable member extending across the path of said buckets above said opening in closely spaced relation to the housing to define with the housing and bucket a vacuum chamber in communication with said suction opening.

* * * * *